UNITED STATES PATENT OFFICE.

THOMAS CHRIMES, OF JACKSON, MICHIGAN.

IMPROVEMENT IN ARTIFICIAL STONE.

Specification forming part of Letters Patent No. 145,277, dated December 9, 1873; application filed November 6, 1873.

*To all whom it may concern:*

Be it known that I, THOMAS CHRIMES, of the city and county of Jackson, in the State of Michigan, have invented an Improved Composition for Artificial Stone, of which the following is a specification:

This invention relates to the production of a superior artificial stone, which shall be more indurate and compact than the old varieties, and less acted upon by atmospheric influences. The invention consists in combining artificial pozzuolana, lime, and iron with sand and cement by means of a solution of potash, as hereinafter set forth.

To produce an artificial pozzuolana for this composition, I take furnace-cinder, (the analysis of which is, silica, fifty-three; lime, twenty-two; alumina, sixteen; magnesia, five; oxide of iron, four,) and combine it with silicate of alumina or highly-burned clay, using two parts of cinder and one part of clay. I employ twelve parts of this artificial pozzuolana with sand, fifty-five parts; Portland cement, twenty-six parts; lime, four parts; and oxide of iron, three parts. The oxide of iron, in a soluble state, is first mixed with the lime and pozzuolana. The cement and sand are then added. The whole is moistened with a solution of potash. The potash facilitates the conversion of the silica to silicate of lime. Vegetable or animal oil is, preferably, added to the moistening mixture or solution, to prevent efflorescence; but this does not constitute any essential part of the present invention.

The formula above stated is one most generally employed and preferred, but it is necessarily slightly changed according to circumstances. I do not, therefore, confine my invention to the proportions specified.

The artificial stone produced according to this invention is very hard and solid, and is proof against deterioration by atmospheric influences in a superior degree.

The following is claimed as new, namely:

The composition for artificial stone herein described, consisting of artificial pozzuolana, lime, and iron, combined with cement and sand by means of potash in solution, substantially as set forth.

THOMAS CHRIMES.

Witnesses:
JOHN M. SNOOK,
JOHN R. CHRIMES.